Aug. 29, 1961 E. S. PETERSON 2,998,488
DIAL TELEPHONE OPERATED RECORDING SYSTEM
Filed Sept. 23, 1953
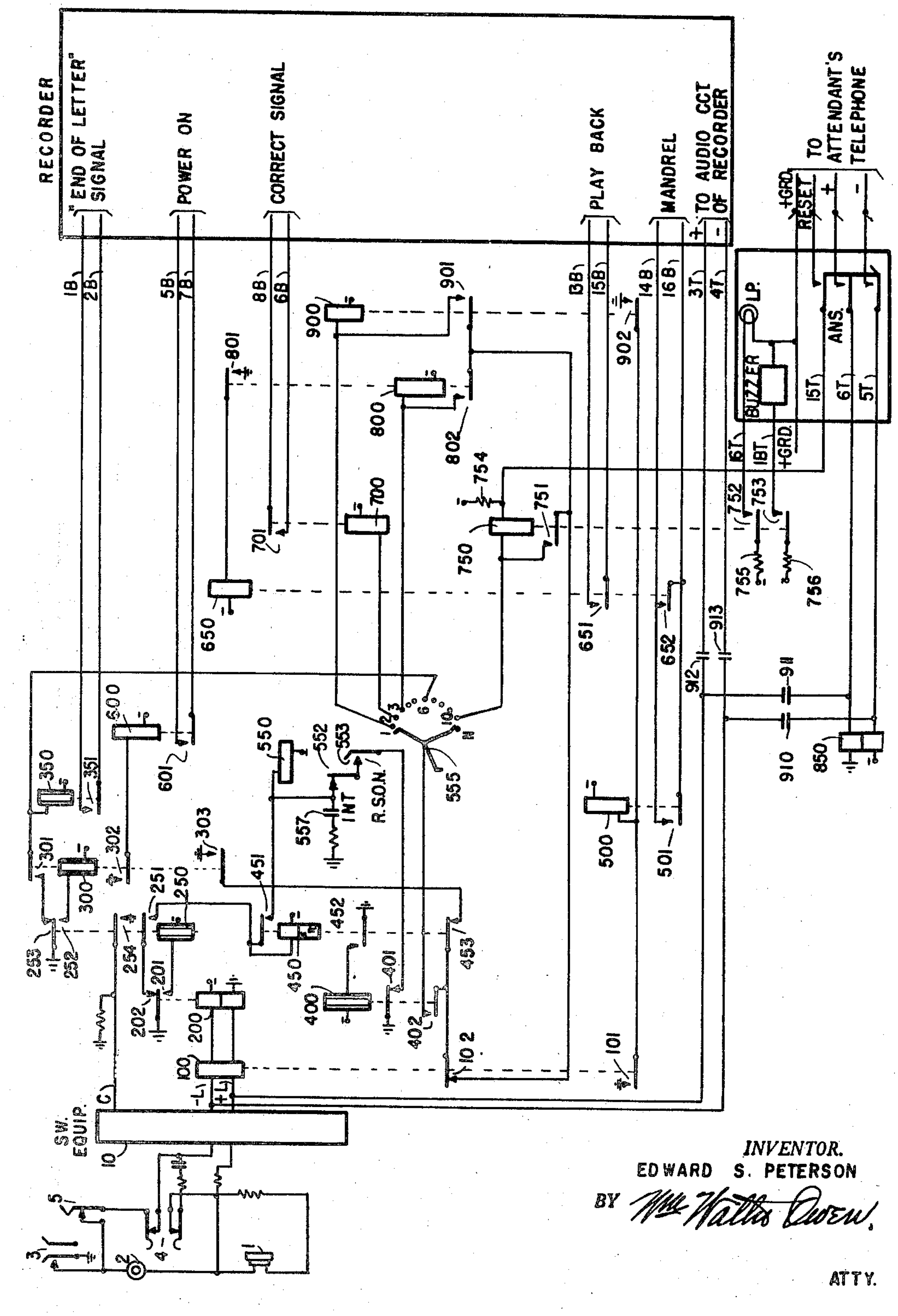
INVENTOR.
EDWARD S. PETERSON
BY Wm. Walter Owen,
ATTY.

United States Patent Office 2,998,488

Patented Aug. 29, 1961

2,998,488

DIAL TELEPHONE OPERATED RECORDING SYSTEM

Edward S. Peterson, Elmwood Park, Ill., assignor to Automatic Electric Laboratories, Inc., a corporation of Delaware Filed Sept. 23, 1953, Ser. No. 381,846

16 Claims. (Cl. 179—6)

This invention relates to improvements in automatic recording systems in which centrally located recording equipment can be used and controlled over telephone lines by telephone subscribers. It may be considered as an improvement on Patent 1,993,870 issued to A. H. Belliveau on March 12, 1935.

The basic object of this invention is to provide an improved arrangement wherein access may be had to one of a number of remotely located dictating machines by a telephone subscriber, the subscriber having the same control over the remote dictating machine as he would have over a personal dictating machine, and additionally, to provide the feature of enabling the subscriber to communicate with an attendant stationed with the dictating machines.

Other objects and advantages of the invention will become apparent during the course of the description to follow. The invention disclosed is not intended to be restricted to any single embodiment but is intended to include modifications.

The drawing, FIG. 1, diagrammatically depicts the basic invention described.

The dictating machines to be used in conjunction with the circuits disclosed herein are the conventional type with provisions for turning power to the machines on and off, for starting and stopping rotation of the mandrel, for causing the machine to reproduce or "play back" that which has been dictated, for marking corrections and for marking the end of a particular letter or piece of dictation.

*General operation*

When a subscriber wishes to dictate, he lifts his telephone receiver or handset and dials the particular number associated with the dictating machine station. The regular switching equipment of the automatic telephone system thereupon connects him in known manner to an idle dictating circuit associated with an idle dictating machine. When this circuit is seized by the subscriber's line, power to the dictating machine is automatically turned on, that is, the motor to which the mandrel is connected through a clutch arangement is started and the electronic amplifying circuits are energized. When ready to dictate, the subscribed need only operate a push button or switch on his telephone or he may dial a particular number on his telephone, and a recording stylus on the dictating machine will engage a cylinder or record on the mandrel which will be caused to rotate when the clutch to the motor is engaged. The subscriber then commences his dictation. Should he make an error in his dictation and wish to mark such error on a paper slip which accompanies the cylinder or record, he need only dial another number on his telephone, thereby activating certain components of the dictation circuit which in turn causes operation of a marking stylus which inscribes a mark designating a correction on the paper slip.

If the subscriber is to dictate several letters on a single cylinder or record and wishes to mark the end of each letter, he dials another number which causes another marking stylus to leave an impression or mark on the paper slip accompanying the cylinder or record showing where the end of each particular dictated letter appears on the cylinder.

To listen to that which has already been dictated, the subscriber dials still another number, and certain components of the recording circuit are activated causing the dictating machine to switch to the reproduce position, and play back a short interval of the dictated material. If the subscriber wishes to play back longer lengths, he need merely repeat the dialling operation.

If a subscriber wishes to communicate with an attendant stationed at the dictating machines, he dials still another number, thereby causing certain elements of the recording circuit to operate and in turn operate a signal at the attendant's telephone. Upon the attendant's answering, the signal stops and the attendant's telephone is connected to the subscriber's telephone, so as to permit conversation.

*Detailed operation*

When a subscriber wishes to make use of the centrally located dictating equipment, he only has to pick up his handset, thereby closing contacts of hookswitch 4, and dial the appropriate number of the dictating station with the dial 5. In any well known manner, through intermediate switching equipment such as shown at 10, the said handset comprising a receiver 1 and a transmitter 2, becomes connected to an idle dictating circuit over conductors —L and +L.

When the subscriber's hookswitch thus completes a local circuit between conductors —L and +L, relay 200 is energized, in series with relay 100, over the said subscriber's line. Relay 100 is a differential relay having two windings opposing each other, and in the present instance both windings are energized equally, thereby preventing operation of the relay.

When relay 200 operates, contact 201 closes to complete a circuit from ground through coil of relay 250 to battery, thereby causing operation of relay 250 and the subsequent closing of contacts 251, 252 and 254.

The closing of contact 252 completes a circuit from ground through relay coil 300 to battery. Relay 300 is operated and contacts 301, 302 and 303 are closed. Upon the closing of contact 302, a circuit is completed from ground, through coil of relay 600 to battery, and relay 600 is operated thereby closing contact 601. Contact 601 connects leads 5B and 7B which are in the power circuit leading to the associated dictating machine, hence power to the dictating machine is turned on and the dictating machine electronic and motor circuits are energized.

The subscriber's telephone is equipped with a push button or a key 3 that connects both sides of the line to ground. When ready to dictate, the dictator operates push button 3, preferably in the handset, thereby shunting the lower windings of differential relay 100 and relay 200. Relay 200 remains operated, and relay 100 with only one winding energized now operates, and contact 101 closes and contact 102 is opened, and both remain so as long as the push button 3 in the telephone is operated. Upon the closing of contact 101, a circuit is completed from ground through coil of relay 500, to battery, and relay 500 is energized causing contact 501 to close. Contact 501 closes a circuit between conductors 14B and 16B leading to the dictating machine and controlling the operation of the mandrel thereon. The record cutting needle engages the cylinder or record, the mandrel starts turning, and the dictation may begin.

During pauses in the dictation, the dictator may release the push button in his handset, thereby causing the mandrel to stop but leaving the dictating machine energized, with power connected to the electronic and the motor circuits. To continue with the dictation after a pause, the dictator need only operate his push button 3 again.

If the amount of dictation is long, and the dictator considers it inconvenient to keep push button 3 operated continuously, he may avoid this necessity by dialling the digit "1" on his telephone, and the same result will be accomplished, as will now be explained.

The grounding push button 3 is left normal while dialling the digit "1," and differential relay 100 is not operated due to both of its opposing windings being energized at the same time. Relay 200 is operated, and as before explained, power is connected to the dictating machine. When the digit "1" is dialled, there is one interruption in the operating circuit of relay 200. Therefore, relay 200 will release for an instant and contact 201 will open and contact 202 will close. The opening of contact 201 will not release relay 250, because of the slow-to-release characteristic of this relay, but the momentary closing of contact 202 will complete a circuit from ground, through contacts 202, 251 and coil of relay 450, to battery. This causes relay 450 to operate and close contacts 451 and 452 and open contact 453. When contact 451 closes, another circuit is completed from ground, through contacts 202, 251, 451 and rotary switch magnet 550 to battery, and the rotary switch magnet operates once causing rotary switch arm 555 to move from normal position to the rotary bank contact number 1.

When contact 452 is closed by operation of relay 450, a circuit is completed from ground, through coil of relay 400, to battery, and relay 400 is operated, thereby opening contacts 401 and closing 402.

Upon the reoperation of relay 200 relay 450 restores, after a short delay. A circuit can now be traced from ground, through contact 303 which is held closed by slow-to-release relay 300, contact 453, contact 402 held closed by slow-to-release relay 400, rotary switch contact arm 555, rotary bank contact number 1, coil of relay 900 to battery. Relay 900 then operates and closes contacts 901 and 902. When contact 902 is closed, a circuit is completed from ground, through contact 902, coil of relay 500, to battery, and relay 500 operates, closing contacts 501. Closing of contact 501 connects together conductors 14B and 16B which start operation of the mandrel in the dictating machine. Dictation may now begin. Relay 500 will remain operated, because relay 900 is locked in the operated position by a circuit traced from battery, coil of relay 900, contacts 901, 102, 453, 303 and ground.

Slow-to-release relay 400 releases after an interval following the release of relay 450 and closes contact 401. RSON (rotary switch off-normal) contact 553 having closed as soon as the rotary switch arm 555 left the normal position, a circuit is now completed from ground through contact 401, RSON contact 553, INT (interrupter) contact 552, magnet 550 and battery, and the rotary switch operates once, taking one step. As this is done, INT contact 552 opens momentarily and then closes. As the INT contact 552 is opened and closed, the magnet 550 is released and reoperated. This cycling continues until the contact arm 555 reaches the normal position, whereupon the RSON contact is opened and the resetting operation is completed.

The mandrel may be stopped by operation of push button 3 on the subscriber's handset, which causes operation of differential relay 100, the opening of contact 102 and the consequent release of relay 900.

The opening of contact 102 opens the circuit completed from ground through contacts 303, 453, 102, 901, coil of relay 900 and battery, and relay 900 is thereby released. Holding contact 901 is opened. When relay 900 drops out, the contact 902 which was in the circuit energizing relay 500 also opens. However, contact 101 now closed by relay 100, is in the circuit which energizes relay 500, and so long as push button 3 in the subscriber's handset is operated, relay 500 will remain operated. But upon the release of the push button in the handset, relay 100 will release, contact 101 will open, and as a result of contact 101 being opened, relay 500 will also be released. This causes the opening of contact 501, and the conductors 14B and 16B are disconnected and the mandrel stops rotating.

The stopping of the mandrel can also be accomplished of course, by the hanging up of the subscriber's handset or by dialing any unassigned digit such as "4." As soon as relay 450 operates, in response to the first impulse, it unlocks relay 900 which releases 500 to stop the mandrel. The rotary switch then speeds back to home position without further action. Dialing an assigned digit such as 2, 3, 6 or 10 will both stop the mandrel and initiate another operation, as will be explained subsequently.

Should the dictator during the course of the dictation make an error which he wishes to mark upon the paper slip or the like that accompanies the cylinder or record, he need only dial the digit "2." In a manner previously described, the rotary switch magnet 550 is operated two times moving the rotary switch arm 555 to the number 2 rotary switch bank contact, with relays 450 and 400 operating on the first pulse and holding during the pulsing. Relay 450 then releases. A circuit is now completed from ground through contacts 303, 453, 402, rotary switch arm 555, rotary bank contact number 2, coil of relay 700 to battery, and relay 700 is energized momentarily, causing contact 701 to close. This connects together conductors 6B and 8B, which are connected to that part of the circuit of the dictating machine which marks corrections, and a correction is caused to be marked.

After this operation has taken place, relays 400 and 700 will release, and the rotary switch will return to a normal position in a manner which has been previously described.

Should the person who is dictating desire to listen to that which has already been dictated, he may do so in the following manner.

First, assuming he was dictating and holding the dictating machine in proper position by continuous operation of the push button 3 at his handset, he need only release the push button 3 and dial the digit "3." Release of the push button 3 will cause differential relay 100 to drop-out, opening contact 101 which will release relay 500. This relay will then open contact 501 which will stop operation of the mandrel.

Second, assume the case where the dictator has been dictating and has been holding the dictating machine in proper position by having dialled the digit "1," as explained before. Under this condition, relay 900 is locked energized and it in turn holds relay 500 through contact 902. Contact 501 of relay 500 in turn maintains the circuit to the dictating machine causing operation of the mandrel. When dictating in this position, to play back, it is merely necessary to dial "3." On the first impulse, relay 200 will release, contact 202 will close, relay 450 will energize and contact 453 will open. This opens the circuit to relay 900 which in turn releases relay 500 which stops operation of mandrel.

In either case, dialling the digit "3" also causes relay 200 to pass three impulses to the rotary switch magnet 550, which operates three times in response, with slow-to-release relays 450 and 400 operating on the first impulse in the usual way. In the before described manner, the rotary switch arm 555 will take three steps and engage rotary bank contact number 3. When relay 450 releases after the last pulse, a circuit is completed from ground, through contacts 303, 453, 402, arm 555, coil of relay 800 to battery. Relay 800 will operate, closing contacts 801 and 802. When contact 802 closes, a holding circuit is completed from ground through contacts 303, 453, 102, 802, coil of relay 800 to battery, and relay 800 will remain operated, even though the rotary switch will return to a normal position from bank contact number 3 when relay 400 releases.

When contact 801 is closed by operation of relay 800, a circuit is completed from ground through contact 801, coil of relay 650 and battery, and relay 650 is operated causing the closing of contacts 651 and 652. The conductors 13B and 15B leading to that component of the dictating machine which shifts the machine into "play back" or "reproduce" position are connected, and a reproduce stylus or needle is allowed to ride in the grooves that have been cut into the cylinder or record.

When contact 652 is closed, conductors 14B and 16B which control the operation of the mandrel on the dictating machine are connected, and the mandrel operates. Since the machine is now in the reproduce or play back position, sound is reproduced and transmitted over the conductors 3T and 4T which are connected by condensers 912 and 913 to the subscriber's line, and the subscriber is able to hear over his receiver 1 that which has already been dictated.

If the dictator is "playing back" and listening to dictated material and then desires to resume dictating, he need only operate the push button 3 on his telephone. This causes operation of differential relay 100 and opening of contact 102 and the closing of contact 101. When contact 102 is opened, the holding circuit for relay 800 is interrupted, causing this relay to drop out and open contact 801. This in turn interrupts the circuit to relay 650, which releases and opens contacts 651 and 652 which are in the play back and mandrel circuits. Hence, the dictating machine shifts out of play back and into normal, or record position and the mandrel is stopped.

The closing of contact 101 by operation of relay 100 causes relay 500 to operate. This relay causes contact 501 to close and energize the mandrel circuit. The dictating machine is now in the record position and the mandrel is operating, so dictation may begin.

The change from play back to dictate may also be accomplished by simply dialling the digit "1." In a manner explained before, a dial pulse will cause operation of relay 450 which will open contact 453 and interrupt the holding circuit of relay 800 which in turn causes release of relay 650, thereby taking the machine out of the play back position.

As explained before, dialling the digit "1" also causes operation of relay 900, which in turn operates relay 500. The closing of contact 501 by relay 500 starts the mandrel, and makes the system ready for dictation.

By dialling the digit "6" the dictator may cause an "end of letter" mark to be made on the slip accompanying the cylinder or record. In a manner described before, the contact arm 555 will advance and finally engage contact number 6 of the rotary contact bank, in response to the six impulses in the circuit from the subscriber's telephone. Relay 450 now restores. A circuit is then completed from ground through contacts 303, 453, 402, rotary switch arm 555, rotary bank contact number 6, coil of relay 350, and battery. Relay 350 will operate causing contact 351 to close. This connects together conductors 1B and 2B, and the mechanism on the dictating machine which causes the marking of "end of letter" is energized and operated. Since only the momentary operation of relay 350 is required for this purpose, there is no holding circuit for relay 350, and this relay will release when the rotary switch returns to a normal position, that is, after the release time delay of relay 400.

The "end of letter" signal will also be given, without the need for dialling, when the dictator hangs up his handset. When this happens relay 200 drops out and contact 201 opens. This causes a drop out of slow relay 250 which in turn causes the opening of contact 252 and closing of contact 253. The opening of contact 252 causes relay 300 to drop out, but this is also a slow-to-release relay, and before contact 301 is opened, a circuit is completed from ground through contacts 253 and 301, and the coil of relay 350 to battery. This causes relay 350 to operate momentarily, during which time contact 351 is closed and the circuit which controls the "end of letter" marking mechanism on the dictating machine is energized.

Other consequences of hanging up the subscriber's handset are discussed later.

When the dictator desires to talk to the attendant in charge of the dictating machines, he dials the digit "0." Arm 555 of the rotary switch moves around and engages the number 10 contact of the rotary switch bank. Thereupon a circuit is completed from ground through contacts 303, 453, 402, arm 555, rotary bank contact number 10, the coil of relay 750 and battery, and relay 750 is operated, closing contacts 751, 752, 753. The rotary switch will thereupon restore, as before described, but relay 750 will remain operated due to a circuit traced from ground through contacts 303, 453, 102, 751, coil of relay 750, resistor 754 and battery.

The closing of contact 752 completes a circuit from battery through resistor 755, contact 752, conductor 16T, through the lamp at the attendant's station, to ground. The attendant's light will thereupon be lit.

The closing of contact 753 completes another circuit from battery through the resistor 756, contact 753, conductor 18T through the buzzer at the attendant's position, to ground. The attendant's buzzer will thereupon operate, and the attendant is thereby given an audible as well as a visible signal that she is being called. When the attendant observes this signal, she operates the answer key, ANS, and her telephone is cut in on the talking circuit through condensers 910 and 911. Direct current supply of voltage for the attendant's telephone is provided by battery and ground through the transmission coil 850.

Upon operation of the answer key, ANS conductor 15T is connected to ground, and the relay 750 is shunted out of the circuit, opening contacts 752 and 753, and cutting off the buzzer and lamp signals.

When the dictation has been completed, it is only necessary that the dictator replace his handset, thereby opening hookswitch contacts 4. If he has been dictating and the mandrel is rotating, or if he has been playing back and the mandrel is in operation, operation of the hookswitch will release all circuits, since both relay 100 and relay 200 will be deenergized. Release of relay 200 causes release of relay 250, which in turn releases relay 300 which causes opening of contact 302 which opens the circuit to relay 600 which releases and opens contact 601 which disconnects power from the dictating machine. Any other operated relays will also release, and restore the circuit to normal.

The invention herein described is illustrative of what is considered a preferred embodiment. It is to be understood, however, that various modifications may be made within the spirit of the invention by those skilled in the art.

The invention having been described, those novel features it is desired to have protected by Letters Patent are set out in the claims which follow:

What is claimed is:

1. A remotely controlled dictating system comprising a plurality of electrically operated dictating machines, a plurality of remotely located dictators dial telephones, a key associated with each of said telephones, a two conductor telephone circuit connected to each of said dictating machines, means for connecting any one of said telephones to any one of said telephone circuits, first and second control means in said telephone circuit, switching means for switching said dictating machine into and out of recording position, means whereby said last means performs either of said switching functions in response to operations of either of said control means, means whereby one of said control means is operated responsive to an operation of the dial on said telephone, and means whereby the other of said control means is operated responsive to a change of position of the key associated with said telephone.

2. A control circuit for use with an electrically operated dictating machine including a two conductor line incoming to said circuit and means for opening and closing said line and means for unbalancing said line, means in said control circuit for energizing said dictating machine, means whereby said energizing means is operated responsive to the closing of said line, means in said control circuit for shifting said dictating machine into recording position, a first and a second relay means in said line for operating said shifting means, means whereby said first relay means is operated responsive to a momentary interruption in said closed line, and means whereby said second relay means is operated responsive to a change in the balance of said line.

3. In a control circuit for use with an electrically operated dictating machine having a record condition and a reproduce condition, a two conductor speech circuit incoming to said circuit, external means for closing said speech circuit and external means for interrupting said closed circuit, means for seizing said control circuit responsive to an external closing of said speech circuit by said closing means, means in said control circuit for placing said dictating machine in the reproduce condition, means whereby said last means is operated responsive to a single series of momentary external interruptions in said speech circuit by said interrupting means, means in said control circuit for shifting said dictating machine from the reproduce condition to the record condition, and means whereby said last means is operated responsive to a different single series of momentary external interruptions in said speech circuit.

4. In a control circuit for use with an electrically operated dictating machine having recording and reproducing positions, a two conductor control and speech line incoming to said circuit and means for closing said line, for interrupting said line, and for changing the balance of said line, means in said control circuit for energizing said dictating machine responsive to the closing of said line, switch means, means in said control circuit for shifting said dictating machine to the reproduce position, means whereby said shifting means is operated by said switch means responsive to a series of momentary interruptions in said closed line, means in said control circuit for shifting said dictating machine from the reproducing position to the recording position and means whereby said last means is operated independently of said switch means responsive to a change in the balance of said closed line.

5. In a control circuit for controlling an associated electrically operated dictating machine having recording and reproducing positions and including a two conductor line incoming to said circuit, remote means for closing and opening said line and remote means for unbalancing said line, a relay for energizing said dictating machine, means whereby said relay is operated responsive to an external closing of said line by said closing means, a first relay for shifting said machine to the reproducing position, switch means, means whereby said first relay is operated by said switch means in response to a particular single series of momentary external interruptions in said closed line by said opening means, a second relay for shifting said machine to the recording position, means whereby said second relay is operated by said switch means and said operated first relay is released responsive to a different single series of momentary external interruptions in said closed line, and means whereby said second relay is operated independently of said switch means and said first relay is released responsive to an external change in the balance of said closed line by said unbalancing means.

6. A control circuit for use with an electrically operated dictating machine including a two conductor line incoming to said circuit, external means for closing and opening said line and for interrupting said line, means in said control circuit for energizing said machine, means whereby said last means is operated responsive to an external closing of said incoming line by said closing means, means in said control circuit for placing said machine in condition to receive dictation over said line, means whereby said last means is operated responsive to external changes in the condition of said closed line, switch means, means in said control circuit for causing an end-of-letter marking to be recorded by said machine, means whereby said last means is operated momentarily by said switch means responsive to momentary external interruptions in said closed line by said interrupting means, and means whereby said last means is also operated momentarily independently of said switch means responsive to a prolonged external opening of said closed line by said opening means.

7. A control circuit as in claim 6 together with a remotely located telephone station including a handset and dial connected to said two conductor line, a relay in said circuit for controlling said end-of-letter marking means, means whereby said relay is operated momentarily by said switch means responsive to an operation of said dial, and means whereby said relay is also operated momentarily independently of said switch means responsive to the hanging up of said handset.

8. In a control circuit for controlling an electrically operated dictating machine and including a two conductor dictating line incoming to said control circuit, a remote station with means for closing and opening said line and means for unbalancing said line, means in said control circuit for switching said machine to the recording position to record dictation received over said line, means whereby said last means is operated responsive to external changes in the balance of said line, means whereby said last means is released responsive to subsequent external changes in the balance of said line, an attendant's telephone station associated with said dictating machine, a signal at said telephone station, means in said control circuit for operating said signal, switch means whereby said last means is operated responsive to momentary external interruptions in said incoming line, means at said attendant's station for telephonically connecting said station to said incoming line through said control circuit, means whereby said signal operating means is released independently of said switch means responsive to the operation of said connecting means, and means whereby said signal operating means is released independently of said switch means responsive to a subsequent operation of said line unbalancing means.

9. A control circuit for use with an electrically operated dictating machine including a two conductor dictating line incoming to said circuit together with means for closing said line and for interrupting said line, means in said circuit for energizing said machine, means whereby said last means is operated in response to closing of said line, means in said circuit for shifting said machine into recording position, switch means whereby said last means is operated in response to a particular single series of momentary interruptions in said closed line, an attendant's signal, means in said circuit for operating said signal, means whereby said last means is operated by said switch means and said shifting means released responsive to a different single series of momentary interruptions in said closed line, and means whereby said signal operating means is released independently of said switch means responsive to any single series of subsequent interruptions in said closed line.

10. In a control circuit for use with an electrically operated dictating machine, a two conductor dictating line incoming to said circuit, means for changing the condition of said line, means for energizing said machine, means whereby said last means is operated responsive to closing of said incoming line, means for shifting said machine into recording position for receiving dictation over said line, means whereby said last means is operated responsive to changes in the condition of said closed line, an attendant's telephone signal associated with said circuit, means in said circuit for operating said signal, means whereby said last means is operated and said shifting means released responsive to a particular single series of momentary interruptions in said closed incoming line, means whereby said signal operating means is released responsive to a subsequent change in the balance of said closed incoming line, and means whereby said signal operating means is released responsive to any single series of subsequent interruptions in said line.

11. Control equipment for use in a remotely controlled dictating system wherein an electrically operated dictating machine may be controlled from a dial telephone comprising a dial and a line grounding key associated with said telephone and a control circuit associated with said dictating machine, a two wire line connecting said telephone to said control circuit, means in said control circuit for shifting said machine into and out of position for recording dictation received over said line switch, means in said control circuit for operating said shifting means into and out of recording position responsive to a single series of impulses in each case received over said line, other means in said control circuit for operating said shifting means into and out of recording position independently of said switch means responsive to a change in the balance of said line, and means whereby said last two means are operated from said telephone dial and line grounding key respectively at will.

12. Control equipment for use in a remotely controlled dictating system wherein any one of a plurality of electric dictating machines may be controlled from any one of a plurality of telephones comprising a control circuit for each said dictating machine and a dial and line grounding key for each said telephone, a two wire dictating line incoming to each control circuit, means for connecting any one of said telephones to any one of said control circuits over its said two wire line, means in said circuit for shifting the associated machine into play back position, switch means whereby said last means is operated responsive to a particular single series of impulses received over the associated dictating line, means in said circuit for shifting said machine from play back to recording position, means including said switch means in said control circuit for operating said last shifting means responsive to a different single series of impulses received over the associated line, means in said control circuit for operating said last shifting means responsive to a change in the balance of said dictating line, and means whereby said last two means are controlled and operated from said telephone dial and line grounding key respectively at will.

13. In a combined automatic telephone system and dictation system, lines having respective stations thereon each equipped with an impulse sender for transmitting digit impulses for controlling automatic switching apparatus, common trunks, dictation trunks each having a dictation machine connected thereto, first switching apparatus and means for operating it to connect the line of any calling station with an idle common trunk, second switching apparatus and means for operating it responsive to digit impulses received at any connected common trunk from a calling line to selectively connect that trunk either to a desired called line or to an idle dictation trunk, each dictation machine including separate electromagnets for controlling respective functions thereof, each dictation trunk having control apparatus associated therewith for respectively controlling the said electromagnets, and means in each dictation trunk for selectively controlling the control apparatus thereof responsive to further impulses received from any connected calling line.

14. In a combined automatic telephone system and dictation system according to claim 13, an attendant telephone station associated with the dictation machines, signal devices at the attendant station corresponding respectively to the dictation trunks, switching means enabling an attendant to connect the attendant station to any dictation trunk, the control apparatus of each dictation trunk including selectively controlled means for causing the associated signal device to display a call signal.

15. In combination, a group of dictation machines, dictation trunks extending respectively to the dictation machines, dictating telephone stations, switching means for connecting any station to any idle dictation machine by way of its dictation trunk for recording voice signals from the connected station and for subsequently severing any such connection, each station including means for sending control signals to any connected dictation trunk, marking means in any dictation trunk for marking the end of a recorded message in response to one such signal, and means responsive to the act of severing a connection between any connected station and dictation trunk for actuating the said marking means.

16. In a dictation recording system, lines having respective stations thereon each equipped with an impulse sender for transmitting digit impulses for controlling switching apparatus, a dictation trunk having a dictation machine connected thereto, switching apparatus for connecting said dictation trunk to any one of said lines in a calling condition, switch means associated with said dictation machine for controlling its starting and stopping, manually operable switch means at at least one of said stations, means for changing an electrical characteristic of a circuit extending from said station to said dictation trunk responsive to the actuation of said last-mentioned switch means, means associated with said dictation trunk for controlling said switch means associated with said dictation trunk responsive to said changes of said electrical characteristic, and other means associated with said dictation trunk for controlling said switch means associated with said dictation trunk responsive to impulses transmitted by the impulse sender at any one of said stations, said other means adapted to exercise said control independent of said changes of electrical characteristic.

References Cited in the file of this patent

UNITED STATES PATENTS

| | | |
|---|---|---|
| 1,993,870 | Belliveau | Mar. 12, 1935 |
| 2,066,672 | De Berard et al. | Jan. 5, 1937 |
| 2,472,435 | Peterson | June 7, 1949 |